(12) United States Patent
Ono et al.

(10) Patent No.: US 6,564,833 B2
(45) Date of Patent: May 20, 2003

(54) GAS DISCHARGE STRUCTURE FOR GASEOUS FUEL

(75) Inventors: Tohru Ono, Saitama (JP); Yozo Kami, Saitama (JP); Masami Ogura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 53 days.

(21) Appl. No.: 09/957,542

(22) Filed: Sep. 21, 2001

(65) Prior Publication Data

US 2002/0036026 A1 Mar. 28, 2002

(30) Foreign Application Priority Data

Sep. 22, 2000 (JP) ........................... 2000-288653

(51) Int. Cl.$^7$ ................................ F16K 24/00
(52) U.S. Cl. ........................... 141/86; 137/587
(58) Field of Search ................. 141/86, 87, 88, 141/98, 115, 231; 137/312, 313, 314, 351, 587, 588; 220/86.2, 581, 746

(56) References Cited

U.S. PATENT DOCUMENTS 5,701,928 A * 12/1997 Aoki ........................ 137/312
6,418,962 B1 * 7/2002 Wozniak et al. ............ 137/266

FOREIGN PATENT DOCUMENTS

JP          8-99544        4/1996

* cited by examiner

*Primary Examiner*—Steven O. Douglas
*Assistant Examiner*—Peter deVore
(74) *Attorney, Agent, or Firm*—Arent Fox Kintner Plotkin & Kahn

(57) ABSTRACT

A gas discharge structure for gaseous fuel includes a discharge pipe leading gaseous fuel that has leaked to the outside of a vehicle. A discharge port of the discharge pipe is faced toward a space formed below a gap between a roof and a tailgate.

6 Claims, 7 Drawing Sheets

FRONT ◄──────► REAR

FRONT ←→ REAR

FIG.6A
FIG.6B
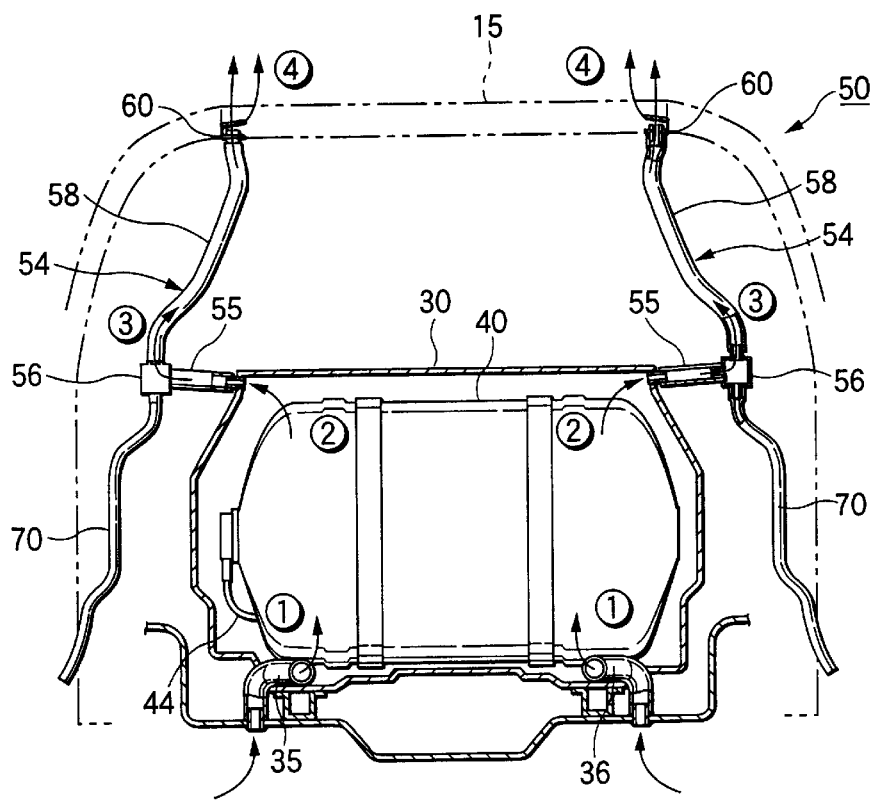
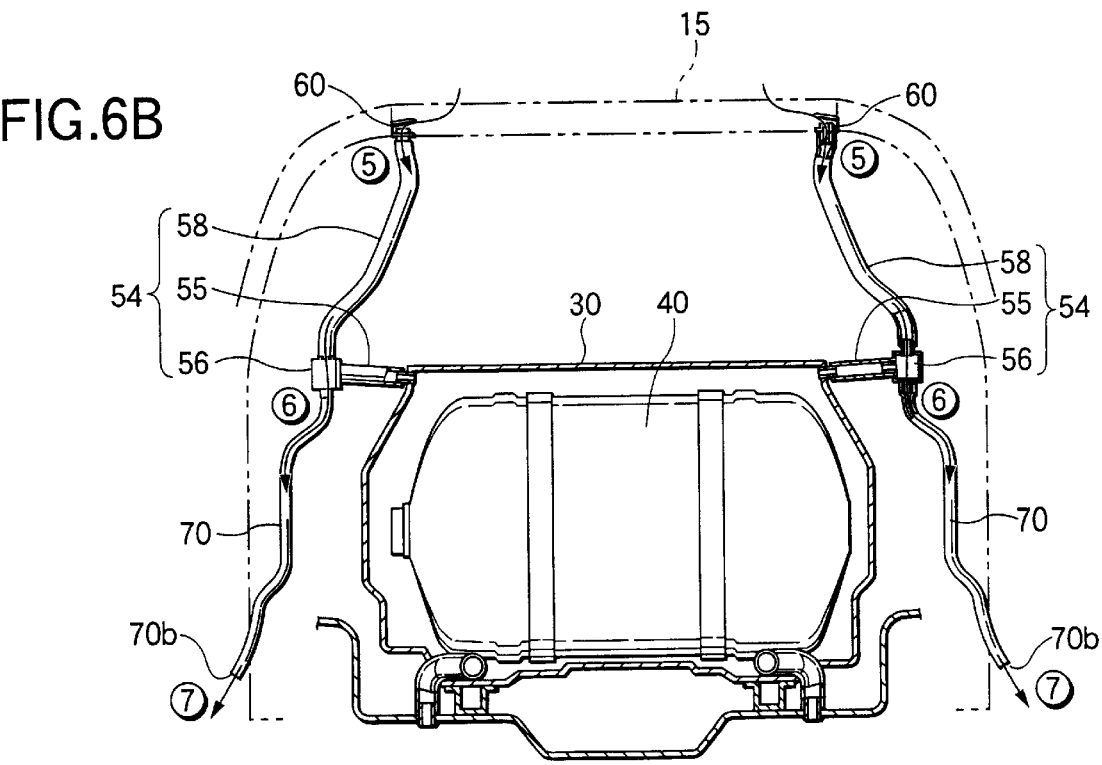

GAS DISCHARGE STRUCTURE FOR GASEOUS FUEL

BACKGROUND OF THE INVENTION

1. Field of the Invention

The present invention relates to a gas discharge structure for gaseous fuel for leading gaseous furl that has leaked to the outside of a vehicle, should there occur a leakage of gaseous fuel.

2. Description of the Related Art

An automotive vehicle equipped with a fuel gas tank is proposed in, for example, JP-A-0-99544 entitled, "MOUNTING STRUCTURE FOR A DISTAL END OF A GAS DISCHARGE PIPE FOR COMPRESSED FUEL THAT LEAKS." In this automotive vehicle, the fuel gas tank is mounted in the trunk at the rear portion of the vehicle body, the outlet of the gas supply pipe is connected to the fuel gas tank, and the supply port of the gas supply pipe is faced toward the filler recessed portion in the side wall of the vehicle body.

According to this construction, fuel gas can be filled into the fuel gas tank from the supply port of the gas supply pipe.

With this fuel gas tank, it is predicted that fuel gas leaks from the main body of the fuel gas tank and the connecting portion where the gas supply pipe is connected to the fuel gas tank. Due to this, should there occur a leakage of fuel gas, a gas discharge pipe is provided on the automotive vehicle for discharging fuel gas that has leaked to the outside of the vehicle.

This gas discharge pipe is able to discharge fuel gas that has leaked to the outside of the vehicle by making the discharge port face the atmosphere from the filler recessed portion.

Since the filler recessed portion constitutes the side wall of the vehicle body of the automotive vehicle, it is desirable that the configuration of the filler recessed portion be kept small in consideration of the external appearance of the automotive vehicle. To cope with this, two piping systems such as the gas supply pipe and the gas discharge pipe must be mounted within the filler recessed portion whose configuration is so kept small, there is imposed a limitation to the layout of the gas supply pipe and the gas discharge pipe. Therefore, the degree of freedom in designing gas supply pipes and gas discharge pipes is decreased.

SUMMARY OF THE INVENTION

To this end, an object of the present invention is to provide a gas discharge structure for gaseous fuel which provides no risk of damaging the external appearance of an automotive vehicle and can increase the degree of freedom in design.

With a view to attaining the object, according to a first aspect of the invention, there is provided a gas discharge structure for gaseous fuel for leading gaseous fuel that has leaked to the outside of a vehicle through a discharge pipe, wherein a discharge port of the discharge pipe is faced toward a space formed below a gap between a roof and a tailgate.

The discharge port of the discharge pipe is faced toward the space formed below the gap between the roof and the tailgate. Since this allows the discharge port of the discharge pipe to be covered with the roof and the tailgate, the discharge port of the discharge pipe can be left invisible from the outside of the vehicle.

In addition to this, since the discharge port of the discharge pipe can be covered with the roof and the tailgate, there is no need to provide on the vehicle body a cover for covering the discharge port of the discharge pipe. Consequently, the limitation to design can be reduced.

According to a second aspect of the invention, there is provided a gas discharge structure for gaseous fuel as set forth in the first aspect of the invention, wherein a distal end of the discharge pipe is protruded a certain distance from a stepped portion constituting a bottom gap, and wherein a water penetration preventing member is provided at a position spaced apart a certain distance from the distal end.

The distal end of the discharge pipe is protruded over a certain distance from the stepped portion. This allows water flowing over the surface of the stepped portion when it rains or during car washing to be blocked out at the distal end of the discharge pipe. Consequently, it is possible to prevent the ingress of water from the distal end of the discharge pipe.

In addition to this, the water penetration preventing member is provided at the position spaced apart a certain distance from the distal end of the discharge pipe. This allows water entering the space from the gap between the roof and the tailgate to be received by the water penetration preventing member. Consequently, it is possible to prevent water from penetrating from the distal end of the discharge pipe.

According to a third aspect of the invention, there is provided a gas discharge structure for gaseous fuel as set forth in the second aspect of the invention, wherein a water slope is provided on upper surfaces of the stepped portion and the water penetration preventing member.

The water slope is provided on the stepped portion. Consequently, it is possible to ensure that water flows along the surface of the stepped portion, thereby making it possible to prevent water from staying on the upper surface of the water penetration preventing member.

According to a fourth aspect of the invention, there is provided a gas discharge structure for gaseous fuel as set forth in the first aspect of the invention, wherein a water drain pipe is attached to the discharge pipe for draining water that has penetrated into the discharge pipe.

The water drain pipe is attached to the discharge pipe. Should there occur the penetration of water into the discharge pipe, this allows water that has so penetrated to be discharged to the outside through the water drain pipe. Consequently, it is possible to prevent water from staying within the discharge pipe.

BRIEF DESCRIPTION OF DRAWINGS

FIGS. 6A and 6B are first explanatory views of the gas discharge structure for gaseous fuel according to the invention.

DETAILED DESCRIPTION OF THE PREFERRED EMBODIMENTS

Figure 1:
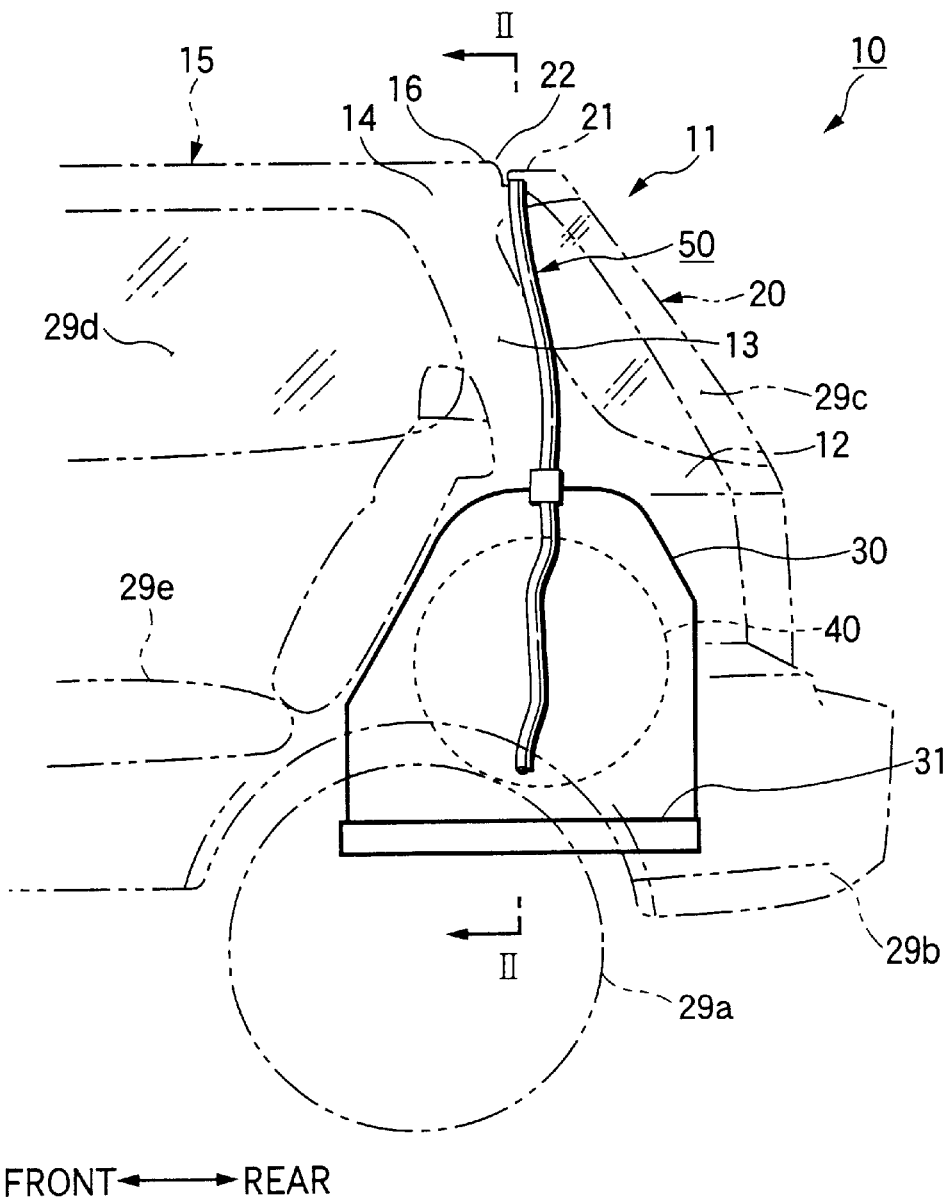
FIG. 1 is a side view of a rear portion of an automobile equipped with a gas discharge structure for gaseous fuel according to the invention.

An embodiment of the invention will be described with reference to the appended drawings.

Directions indicated by "front," "rear," "left," and "right" are those as viewed from the driver. In addition, the drawings are to be viewed as oriented by reference numerals.

FIG. 1 is a side view of a rear portion of an automotive vehicle provided with a gas discharge structure for gaseous fuel according to the invention.

A gaseous fuel automotive vehicle 10 includes a rear pillar 13 at a rear portion 12 of a vehicle body 11. A roof 15 is mounted on an upper end 14 of the rear pillar 13, and an upper frame body 21 of a tailgate 20 is faced toward a rear end 16 of the roof 15 at a certain interval (a gap 22 between the roof and the tailgate). In this state, the tailgate 20 is mounted at the rear portion 12 of the vehicle body 11 in such a manner as to be opened and/or closed. An accommodation case 30 is mounted at a lower end portion of the rear portion 12 via a bracket 31, and a gaseous fuel tank 40 is accommodated in the accommodation case 30, which is provided with a gas discharge structure 50 for gaseous fuel.

The gas discharge structure 50 for gaseous fuel is intended to discharge gaseous fuel that has leaked into the accommodation case 30 to the outside of the vehicle, and the structure will be described in detail below.

Here, gaseous fuel suitable for use for the gaseous fuel vehicle 10 is natural gas or hydrogen gas. In a case where gaseous fuel is natural gas, a natural gas tank is used as a gaseous fuel tank, and in a case where gaseous fuel is hydrogen gas, a hydrogen gas tank is used as the gaseous fuel tank.

In the figure, reference numeral 29a denotes a rear wheel, reference numeral 29b: a rear bumper, 29c: a tailgate window glass, 29d: a rear side window glass, and 29e: a rear seat.

Figure 2:
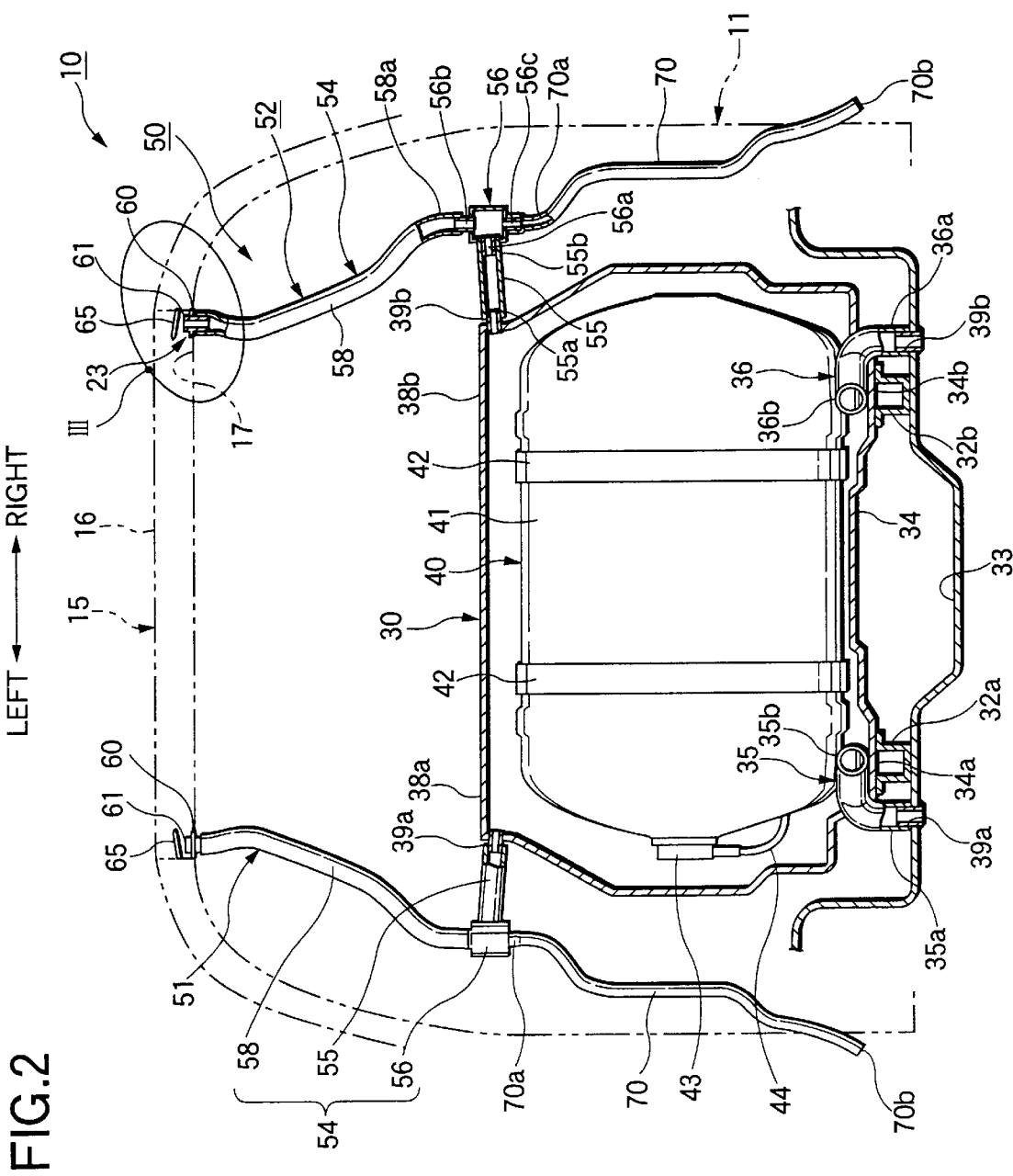
FIG. 2 is a cross-sectional view taken along the line II—II in FIG. 1.

FIG. 2 is a cross-sectional view taken along the line II—II of FIG. 1.

The accommodation case 30 is mounted on a floor panel 33 of the vehicle body 11 via left and right channels 32a, 32b, for accommodating therein a gaseous fuel tank 40 in a closed state. Left and right air introducing pipes 35, 36 are mounted on left and right portions 34a, 34b of a bottom plate 34, respectively, and left and right connecting members 39a, 39b are provided on left and right upper portions 38a, 38b, respectively.

The gas discharge structure 50 for gaseous fuel is connected to the left and right connecting members 39a, 39b, so that the discharge structure 50 for gaseous fuel can be mounted in the accommodating case 30.

The gaseous fuel tank 40 is mounted on a support bracket (not shown) on the vehicle body 11 with two belts 42, 42 which are wound around a tank main body 41, and a gas filler pipe 44 and a gas supply pipe (not shown) are connected to a left end portion 43 of the tank. Gaseous fuel is filled in the gaseous fuel tank 40 through the gas filler pipe 44, and gaseous fuel so filled is then supplied to a driving engine (not shown) through the gas supply pipe.

The left and right air introducing pipes 35, 36 are connected to the communication pipes 39a, 39b at lower end portions 35a, 36a, respectively, so that the lower end portions 35a, 36a are opened to the outside air and the upper ends 35b, 36b are opened to the interior of the accommodating case 30. With thus structure, outside air can be introduced into the accommodation case 30 through the left and right air introducing pipes 35, 36.

The gas discharge structure 50 for gaseous fuel includes a left-hand side gas discharge unit 51 at the left-hand side connecting member 39a of the accommodation case 30 and a right-hand side gas discharge unit 52 at the right-hand side connecting member 39b of the case.

Incidentally, since the left- and right-hand side gas discharge unit 51, 52 are the same constituent members, only the right-hand side gas discharge unit 52 will be described below and hence the description of the left-hand side discharge unit 51 will be omitted.

This gas discharge unit 52 leads gaseous fuel that has leaked into the accommodation case 30 to the outside of the vehicle through a discharge pipe 54. Further, a water penetration preventing member 65 is provided at a position spaced apart by a certain distance from a distal end 61 of the discharge pipe 54, and further, a water drain pipe 70 is attached to the discharge pipe 54, to thereby discharge water penetrated in the discharge pipe 54.

In the discharge pipe 54, an inlet 55a of a first discharge pipe 55 is connected to the right-hand side connecting member 39b, an outlet 55b of the first discharge pipe 55 is connected to a side connecting member 56a of a connecting block 56, and an inlet 58a of a second discharge pipe 58 is connected to an upper connecting member 56b of the connecting block 56. Further, the second discharge pipe 58 is extended upwardly toward the rear end 16 of the roof 15, and the distal end 61 of the second discharge pipe 58 is faced toward a space 23 formed below the gap 22 (shown in FIG. 1) between the roof and the tailgate or the roof-tailgate gap 22.

The water drain pipe 70 is connected to a lower connecting member 56c of the connecting block 56 at an inlet 70a thereof, and is extended downwardly toward a lower end of the vehicle body 11 with an outlet 70b thereof being faced toward the outside of the vehicle body 11.

Figure 3:
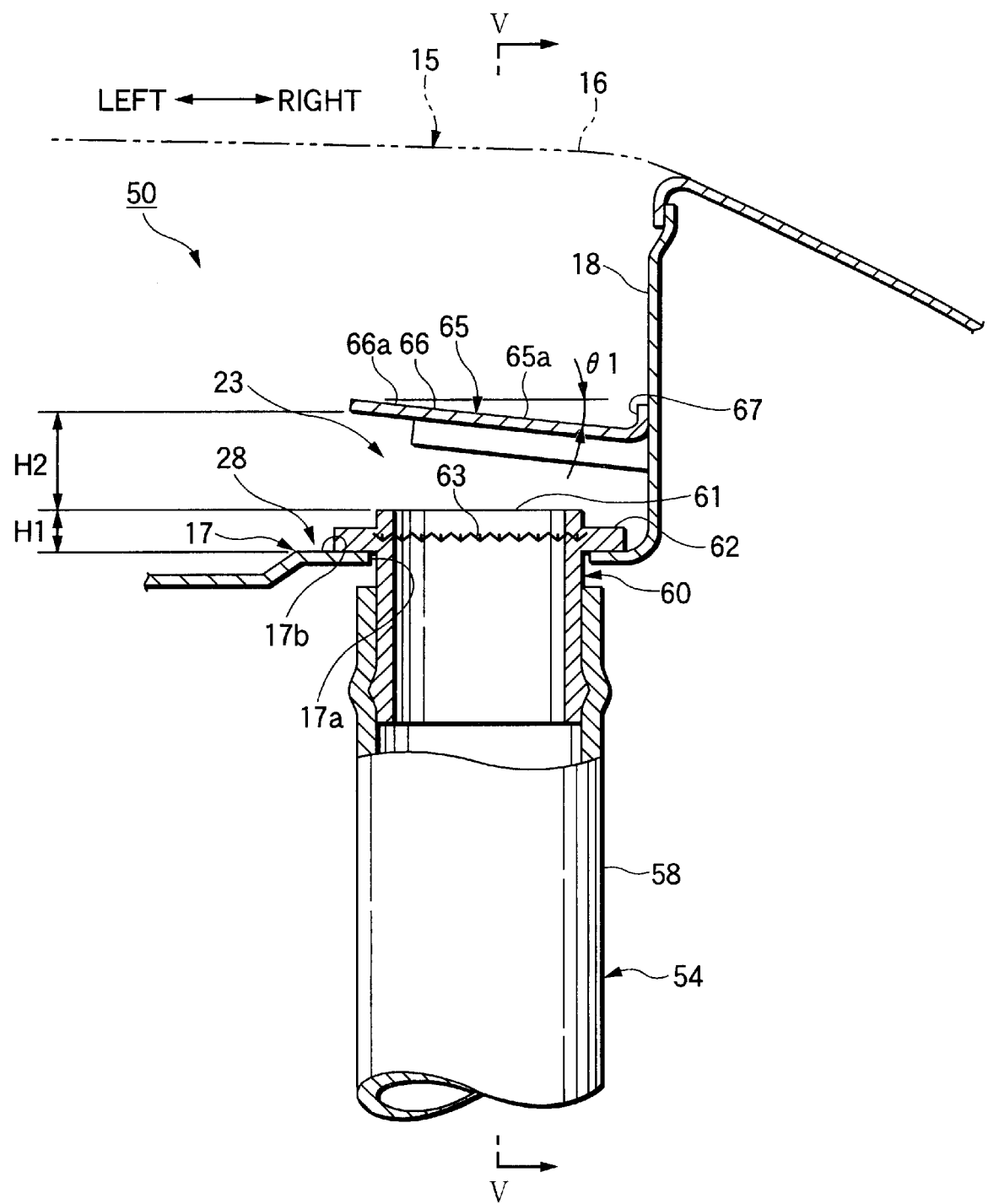
FIG. 3 is an enlarged view of a portion denoted by reference numeral III in FIG. 2.

FIG. 3 is an enlarged view of a portion indicated by a reference numeral III in FIG. 2. As shown in FIG. 3, a bottom plate 17 (constituting part of a stepped portion 28) is provided at the rear portion 16 of the roof 15, and a mounting hole 17a is formed in the bottom plate 17. A discharge port 60 of the second discharge pipe 58 is inserted into the mounting hole 17a, and a flange 62 at the distal end 61 of the discharge port 60 is mounted on a surface 17b of the bottom plate 17, whereby the distal end 61 of the discharge port 60 is protruded from the surface 17b (i.e., the stepped portion 28) of the bottom plate 17 by a certain distance H1.

In addition, reference numeral 63 denotes a metal net for preventing the penetration of dust into the discharge port 60.

Furthermore, FIG. 3 shows a state in which a side wall 18 is provided at the rear portion 16 of the roof 15, and the water penetration preventing member 65 is provided on the side wall 18. This water penetration preventing member 65 is mounted on the side wall 18 at a position spaced apart by a certain distance H2 from the distal end 61 of the discharge port 60, and a transverse water slope θ1 is provided on an upper surface 65a of the water penetration preventing member 65.

Incidentally, the reason why the water slope θ is provided will be described in detail with reference to FIG. 7A.

Figure 4:
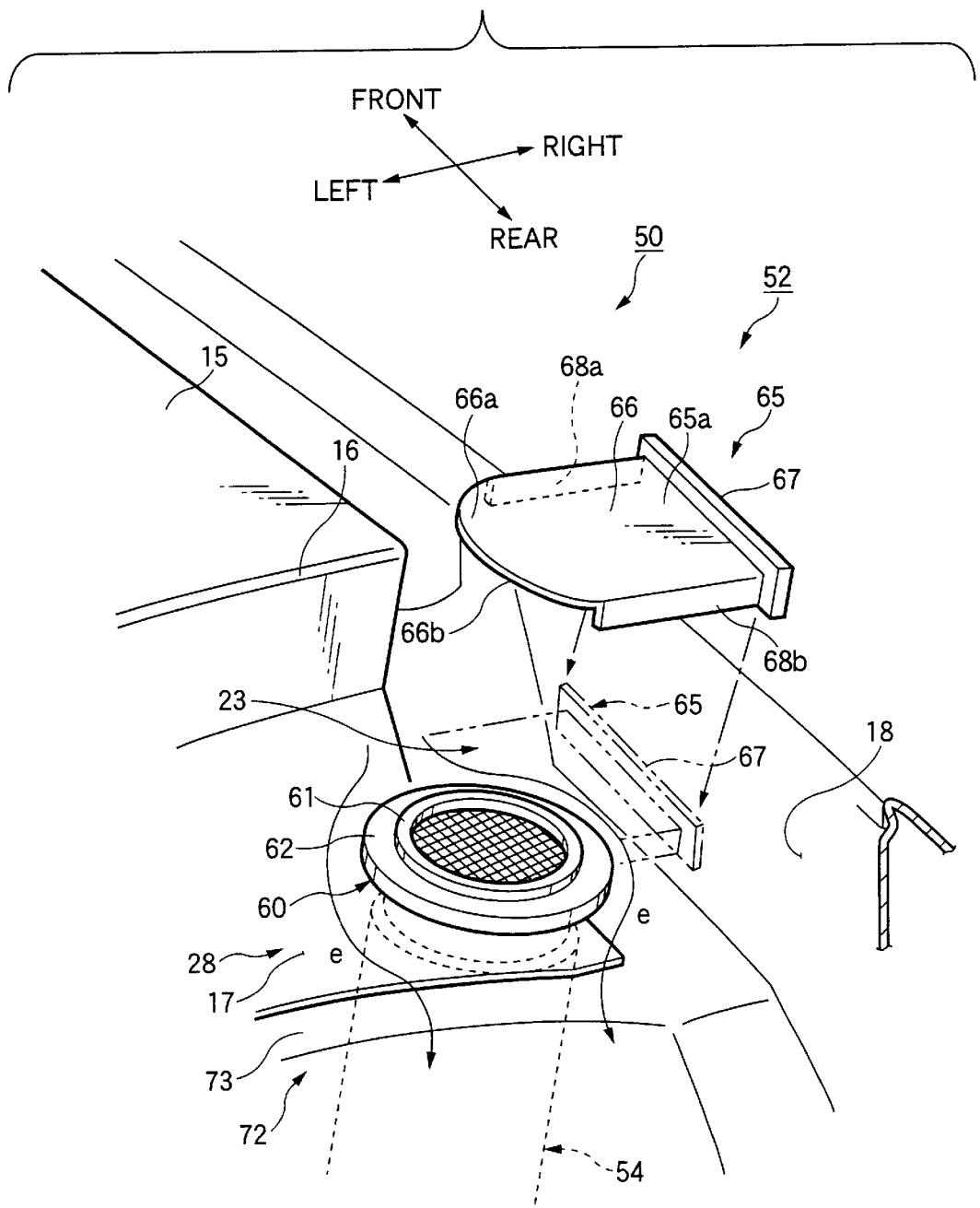
FIG. 4 is a perspective view of the gas discharge structure for gaseous fuel according to the invention.

FIG. 4 is a perspective view of the gas discharge structure for gaseous fuel according to the invention. The bottom plate 17 of the roof 15 is mounted on an upper surface of the bottom plate 17 so as to form the stepped portion 28, and the bottom of the space 23 is formed by the stepped portion 28. And, the flange 62 of the discharge port 60 is mounted on the bottom plate 17, whereby the distal end 61 of the discharge port 60 is allowed to protrude from the stepped portion 28 by a certain distance H1 (shown in FIG. 3).

In addition, FIG. 4 shows the water penetration preventing member 65 which can be mounted at a position indicated by imaginary lines on the side wall 18 of the rear portion 16 of the roof 15.

The water penetration preventing member 65 is constituted by a cover main body 66, which is formed into a substantially flat rectangular plate and curved at a distal end 66a of the plate 66. Further, a mounting piece 67 is formed at a proximal end of the cover main body 66 and folded pieces 68a, 68b are formed at the front and rear of the cover main body 66 in such a manner as to be folded downwardly. The water penetration preventing member 65 is mounted at a position indicated by imaginary lines by welding the mounting piece 67 to the side wall 18.

Since the cover main body 66 is formed such that no folded piece is provided at the distal end 66a, gaseous fuel discharged from the discharge port 60 of the discharge pipe 54 into the space 23 can efficiently be expelled upwardly from the distal end 66a of the cover main body 66.

Since the downwardly folded pieces 68a, 68b are provided at the front and rear of the cover main body 66, rain or washing water can be prevented from running round to a back side 66b of the cover main body 66. Hence, rain or washing water can be prevented from penetrating into the discharge port 60 of the discharge pipe 54.

Figure 5:
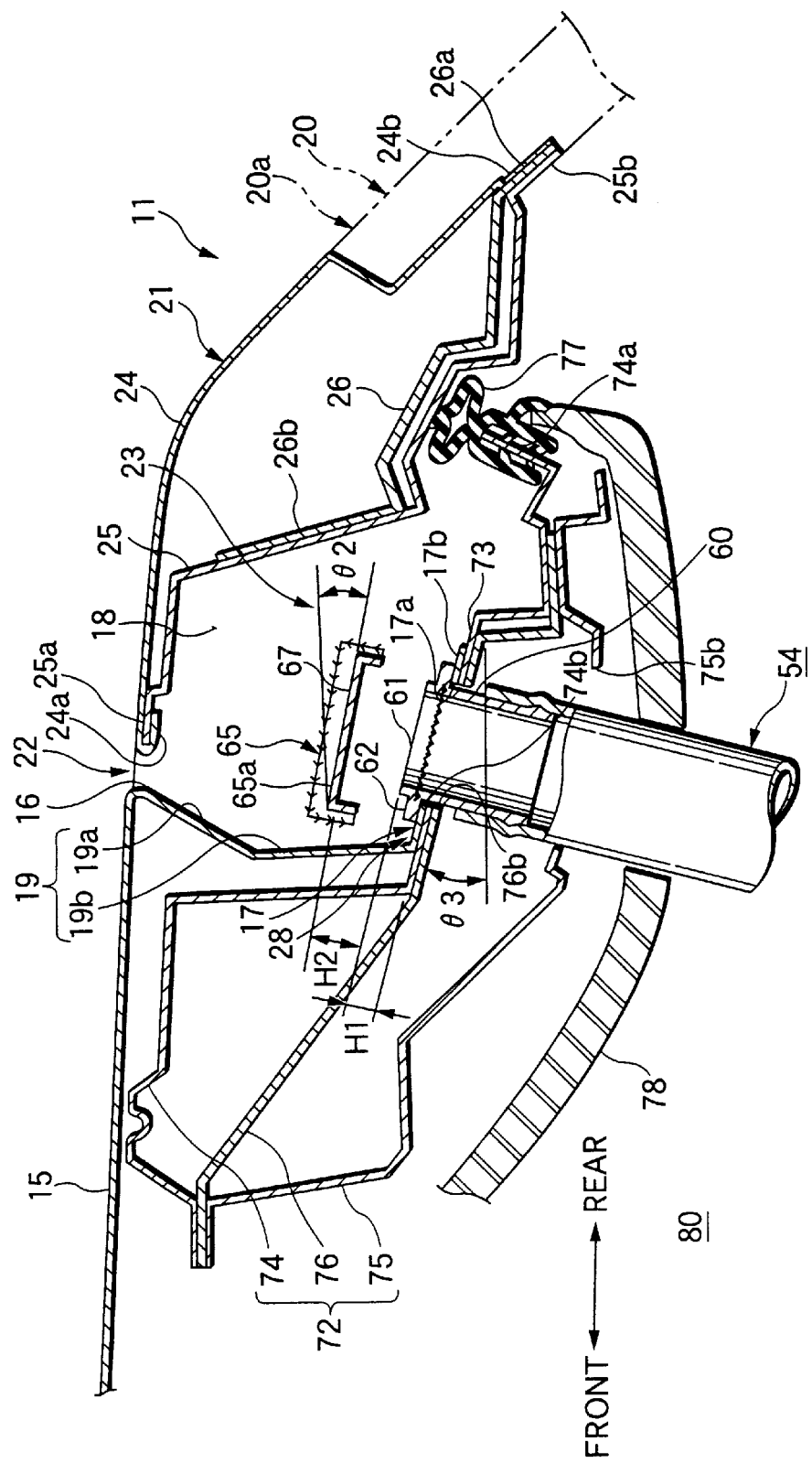
FIG. 5 is a cross-sectional view taken along the line V—V in FIG. 3.

FIG. 5 is a cross-sectional view taken along the line V-V in FIG. 3. The sidewall 18 is provided at the rear portion 16 of the roof 15, the water penetration preventing member 65 is provided at the position spaced apart by the certain distance H2 from the distal end 61 of the discharge port 60 by welding the mounting piece 67 of the water penetration preventing member 65 to the side wall 18, and a longitudinal water slope θ2 is provided on the upper surface 65a of the water penetration preventing member 65.

In addition, the reason why the longitudinal water slope θ2 is provided will be described in detail with reference to FIG. 7B later.

Additionally, FIG. 5 shows a state in which the roof-tailgate gap 22 is formed by the rear end 16 of the roof 15 and the upper frame body 21 of the tailgate 20, and the space 23 is formed below the roof-tailgate gap 22.

The distal end 61 of the discharge port 60 can be covered with the roof 15 and the tailgate 20 by facing the distal end 61 of the discharge port 60 toward the space 23, whereby the distal end 61 of the discharge port 60 can be hidden such that the distal end 61 is invisible from the outside of the vehicle. Accordingly, the appearance of the gaseous fuel automobiles is not damaged.

Furthermore, since the distal end 61 of the discharge port 60 can be hidden by the roof 15 and the tailgate 20, there is no need to mount on the vehicle body 11 a cover for hiding the distal end 61 of the discharge port 60. Consequently, the limitation to designing gaseous fuel automobiles can be reduced, whereby the degree of freedom in designing such cars can be enhanced.

In addition, as shown in FIG. 5, a substantially V-shape rear wall 19 including a tapered piece 19a and a vertical piece 19b is provided at the rear portion 16 of the roof 15. The bottom plate 17 is provided to extend rearwardly from the vertical piece 19b and the mounting hole 17a is formed in the bottom plate 17 so that the discharge port 60 is inserted thereinto. The bottom plate 17 is supported on a roof rail at a central portion 73 (constituting the remaining portion of the stepped portion 28).

The stepped portion 28 is constituted by the bottom plate 17 and the central portion 73 of the roof rail 72.

The roof rail 72 is a member bridged transversely along the rear portion 16 of the roof 15 in which a beam is constructed by allowing a reinforcement member 76 to be held between an upper frame 74 and a lower frame 75, and in which a weatherstrip 77 is provided at a rear end portion 74a of the upper frame 74.

A longitudinal water slope θ3 is provided on the central portion 73 of the roof rail 72 which constitutes part of the bottom of the space 23, and the bottom plate 17 of the roof 15 is mounted on the central portion 73. This allows the water slope θ3 to be provided on the stepped portion 28 constituted by the bottom plate 17 and the central portion 73 of the roof rail 72. As is described above, this stepped portion 28 constitutes the bottom of the space 23.

In addition, the reason why the water slope θ3 is provided will be described in detail with reference to FIG. 7B.

Provided substantially centrally of the upper frame 74 and the reinforcement member 76 of the roof rail 72, respectively, are insertion holes 74b, 76b into which the discharge port 60 is to be inserted. These insertion holes 74b, 76b are disposed concentrically with the mounting hole 17a in the bottom plate 17.

Furthermore, provided substantially centrally of the lower frame 75 of the roof rail 72 is an insertion hole 75b into which the discharge pipe 54 is inserted. The insertion hole 75b is disposed concentrically with the insertion holes 74b, 76b and the mounting hole 17a.

According to this construction, the distal end 61 of the discharge port 60 is allowed to protrude from the stepped portion 28 by mounting the flange 62 of the discharge port 60 on the surface 17b of the bottom plate 17, whereby the discharge port 60 of the discharge pipe 54 is allowed to face the space 23 formed below the roof-tailgate gap 22.

In addition, reference numeral 78 denotes an interior cover. A portion of the roof rail 72 that faces the passenger compartment 80 can be covered with the interior cover 78.

The tailgate 20 is supported at the rear portion 12 of the vehicle body in such a manner as to be freely opened and closed (shown in FIG. 1) and includes the upper frame body 21 at the upper end 20a thereof. In the upper frame body 21, a front end 24a of an upper frame 24 is folded and clamped to thereby integrally hold a front end 25a of a lower frame 25 by the front end 24a of the upper frame 24 so folded and clamped. A reinforcement member 26 is inserted between a rear end 24b of the upper frame 24 and a rear end 25b of the lower frame 25, and a front portion 26b of the reinforcement member 26 is welded to the lower frame 25.

Next, referring to FIGS. 6 and 7, the operation of the gas discharge structure 50 for gaseous fuel will be described below.

FIGS. 6A, 6B are first explanatory diagrams of the gas discharge structure according to the present invention, in which FIG. 6A shows an example in which gaseous fuel is discharged, and FIG. 6B shows an example in which water is drained.

In FIG. 6A, should there occur a case in which gaseous fuel leaks from the connecting portion where the gas filler pipe 44 and the gas supply pipe (not shown) are connected to the gaseous fuel tank 40, gaseous fuel that has leaked is then collected in the accommodation case 30. Outside air is introduced into the accommodation case 30 through the left and right air introduction pipes 35, 36 as indicated by arrows ①.

Due to this, gaseous fuel inside the accommodation case 30 enters the first discharge pipes 55, 55 disposed to the left and right of the gas discharge structure 50 for gaseous fuel as indicated by arrows ②, and then goes on to enter the left and right second discharge pipes 58, 58 via the left and right connecting blocks 56, 56 respectively as indicated by arrows ③.

Here, since the left and right second discharge pipes 58, 58 extend upwardly toward the roof 15, the gaseous fuel smoothly flows through the left and right second discharge pipes 58, 58 to the left and right discharge ports 60, 60 respectively. Consequently, the gaseous fuel can efficiently be discharged from the left and right discharge ports 60, 60 as indicated by arrows ④.

In FIG. 6B, the left and right water drain pipes 70, 70 are attached to the connecting blocks 56, 56, respectively, of the left and right discharge pipes 54, 54. According to this construction, should there occur a case where water penetrates into the discharge pipes 54, 54 from the discharge ports 60, 60, respectively, as indicated by arrows ⑤, water that has so penetrated is led to the left and right water drain pipes 70, 70 through the left and right discharge pipes 54, 54 as indicated by arrows ⑥ so that water can be discharged from discharge ports 70b, 70b of the left and right water drain pipes 70, 70 to the outside of the vehicle as indicated by arrows ⑦.

Consequently, preventing the collection of water in the left and right discharge pipes 54, 54 can secure the long life of the left and right discharge pipes 54, 54.

Figure 7A:
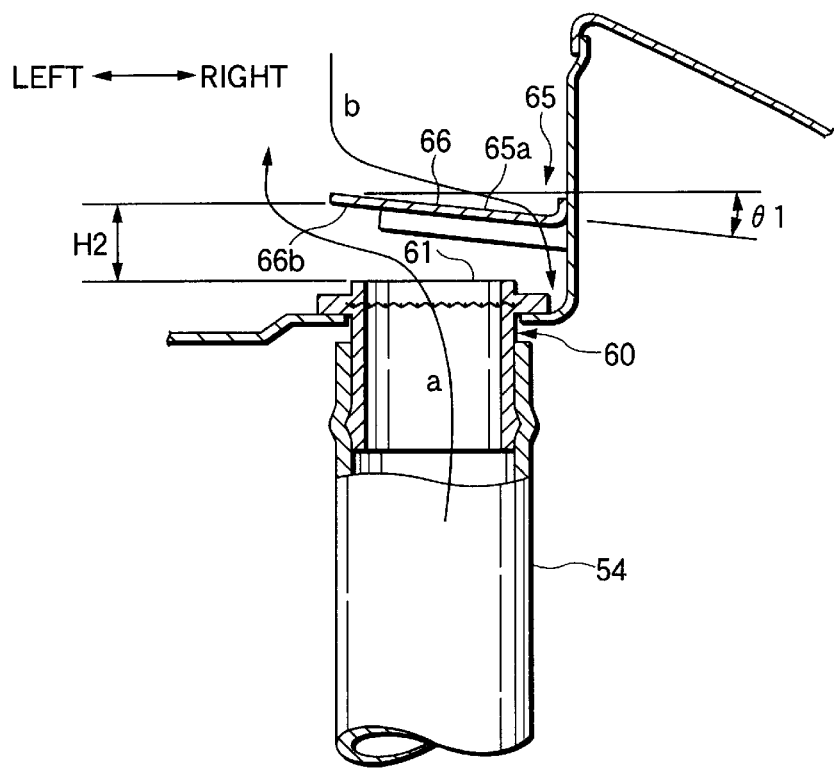
FIGS. 7A and 7B are second explanatory views of the gas discharge structure for gaseous fuel according to the invention.
Figure 7B:
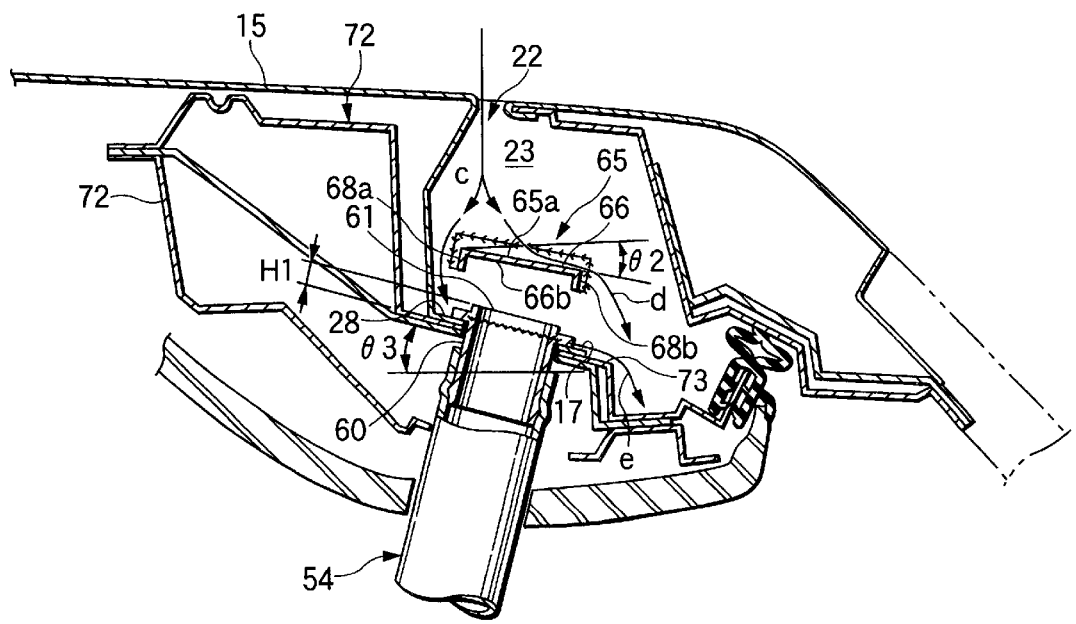

FIGS. 7A, 7B are second explanatory diagrams of the gas discharge structure for gaseous fuel according to the invention, in which FIG. 7A shows an example in which gaseous fuel is discharged, and FIG. 7B shows an example illustrating how rain or washing water is received.

In FIG. 7A, the water penetration preventing member 65 is mounted at the position spaced apart from the distal end 61 of the discharge port 60 by the predetermined interval H2, and the transverse water slope θ1 is provided on the upper surface 65a of the water penetration preventing member 65, whereby gaseous that has flowed out to the atmosphere from the distal end 61 of the discharge port 60 is allowed to smoothly be released upwardly along the back side 66b of the cover main body 66 as indicated by an arrow a.

On the other hand, in a case where rain water or washing water falls from above the water penetration preventing member 65, rain water or washing water that has so fallen is allowed to flow toward the proximal end side of the water penetration preventing member 65 as indicated by an arrow b. Thus, since rain water or washing water can be deviated from the discharge port 60, the penetration of rain water or washing water into the discharge ports 60 can be prevented.

In FIG. 7B, the water penetration preventing member 65 is provided above the distal end 61 of the discharge port 60. Thus, water that has entered the space 23 from the roof-tailgate gap 22 while it is raining or the vehicle is being washed as indicated by arrows c can be received by the water penetration preventing member 65, whereby the penetration of water into the discharge port 60 of the discharge pipe 54 can be prevented.

Furthermore, the longitudinal water slope θ2 is provided on the upper surface 65a of the water penetration preventing member 65. Thus, water flowing over the upper surface 65a of the water penetration preventing member 65 is allowed to flow as indicated by arrows d, whereby the collection of water on the upper surface 65a of the water penetration preventing member 65 can be prevented.

In addition to this, since the downwardly folded pieces 68a, 68b are provided at the front and rear of the cover main body 66, rain water or washing water can be prevented from running round to the back side 66b of the cover main body 66, whereby the penetration of water from the discharge port 60 of the discharge pipe 54 can be prevented.

Furthermore, the distal end 61 of the discharge port 60 is allowed to protrude the predetermined distance H1 from the stepped portion 28. Additionally, the longitudinal water slope θ3 is provided on the stepped portion 28.

Thus, when it is raining or the vehicle is being washed, water flowing over the stepped portion 28 is deflected at the distal end 61 of the discharge port 60 and is allowed to then flow along the stepped portion 28 as indicated by an arrow e (refer to FIG. 4).

Thus, the penetration of rain water or washing water into the discharge pipe 54 from the discharge port 60 can be prevented, and hence the collection of water on the stepped portion 28 can be prevented.

While only certain embodiments of the invention have been specifically described herein, it will apparent that numerous modifications maybe made thereto without departing from the spirit and scope of the invention.

While the above embodiment is described as the case where gaseous fuel that has leaked from the connecting portion where the gas filler pipe 44 or the fuel supply pipe is connected to the gaseous fuel tank 40 is discharged, the invention is not limited thereto and may be applied to a case where gaseous fuel that leaks from the gaseous fuel tank 40 is discharged.

Furthermore, while the above embodiment is described as the case where gaseous fuel that leaks from the connecting portion of the gaseous fuel tank 40 is discharged to the outside of the vehicle, the invention is not limited thereto and the gas discharge structure 50 for gaseous fuel according to the invention maybe used as a discharge pipe for fuel-cell vehicles such that exhaust emissions produced by the fuel cells can be discharged with the discharge structure 50.

Moreover, while the above embodiment is described as the case where the cover main body 66 of the water penetration preventing member 65 is formed into substantially the rectangular shape, the invention is not limited thereto and the cover main body 66 may be formed into, for example, an angle or umbrella shape.

Being constructed as has been described heretofore, the invention provides the following advantages.

According to the first aspect of the invention, the discharge port of the discharge pipe is faced toward the space formed below the gap between the roof and the tailgate. Since this allows the discharge port of the discharge pipe to be covered with the roof and the tailgate, the discharge port of the discharge pipe can be left invisible from the outside of the vehicle. Accordingly, the appearance of the automobiles is not damaged.

In addition to this, since the discharge port of the discharge pipe can be covered with the roof and the tailgate, there is no need to provide on the vehicle body a cover for covering the discharge port of the discharge pipe. Consequently, the limitation to design can be reduced and the degree of freedom in design is improved.

According to the second aspect of the invention, the distal end of the discharge pipe is protruded over a certain distance from the stepped portion. This allows water flowing over the surface of the stepped portion when it rains or during car washing to be blocked out at the distal end of the discharge pipe. Consequently, it is possible to prevent the ingress of water from the distal end of the discharge pipe.

In addition to this, the water penetration preventing member is provided at the position spaced apart from the distal end of the discharge pipe by a certain distance. This allows water entering the space from the gap between the roof and the tailgate to be received by the water penetration preventing member. Consequently, it is possible to prevent water from penetrating from the distal end of the discharge pipe.

Thus, it is ensured that the penetration of water from the discharge port of the discharge pipe is prevented by allowing the distal end of the discharge port to protrude the certain distance from the stepped portion and by providing the water penetration preventing member at the position spaced apart the predetermined interval from the distal end of the discharge port.

According to the third aspect of the invention, the water slope is provided on the stepped portion. It is ensured that water flows along the surface of the stepped portion. Consequently, the collection of water on the surface of the stepped portion can be prevented.

In addition, the water slope is provided on the upper surface of the water penetration preventing member. It is ensured that water flows along the upper surface of the water penetration preventing member. Consequently, the collection of water on the upper surface of the water penetration preventing member.

According to the fourth aspect of the invention, the water drain pipe is attached to the discharge pipe. Should there occur the penetration of water into the discharge pipe, this allows water that has so penetrated to be discharged to the outside through the water drain pipe. Consequently, it is possible to prevent water from staying within the discharge pipe and hence to extend the life of the discharge pipe.

What is claimed is:

1. A gas discharge structure for gaseous fuel comprising:

a discharge pipe adapted to lead gaseous fuel that has leaked to the outside of a vehicle, a discharge port of said discharge pipe being faced toward a space formed below a gap between a roof and a tailgate.

2. A gas discharge structure for gaseous fuel as set forth in claim 1, wherein a distal end of said discharge pipe is protruded from a stepped portion constituting a bottom of said gap by a certain distance.

3. A gas discharge structure for gaseous fuel as set forth in claim 2, wherein a water slope is provided on an upper surface of said stepped portion.

4. A gas discharge structure for gaseous fuel as set forth in claim 1, further comprising:

a water penetration preventing member provided at a position spaced apart from a distal end of said discharge pipe by a certain distance.

5. A gas discharge structure for gaseous fuel as set forth in claim 4, wherein a water slope is provided on an upper surface of said water penetration preventing member.

6. A gas discharge structure for gaseous fuel as set forth in claim 1, wherein a water drain pipe is attached to said discharge pipe for draining water that has penetrated into said discharge pipe.

* * * * *